D. J. SMITH.
GAS PRODUCER.
APPLICATION FILED NOV. 29, 1918.

1,377,935.

Patented May 10, 1921.
2 SHEETS—SHEET 1.

Inventor
David Joseph Smith
By Munn & Co
Attorneys

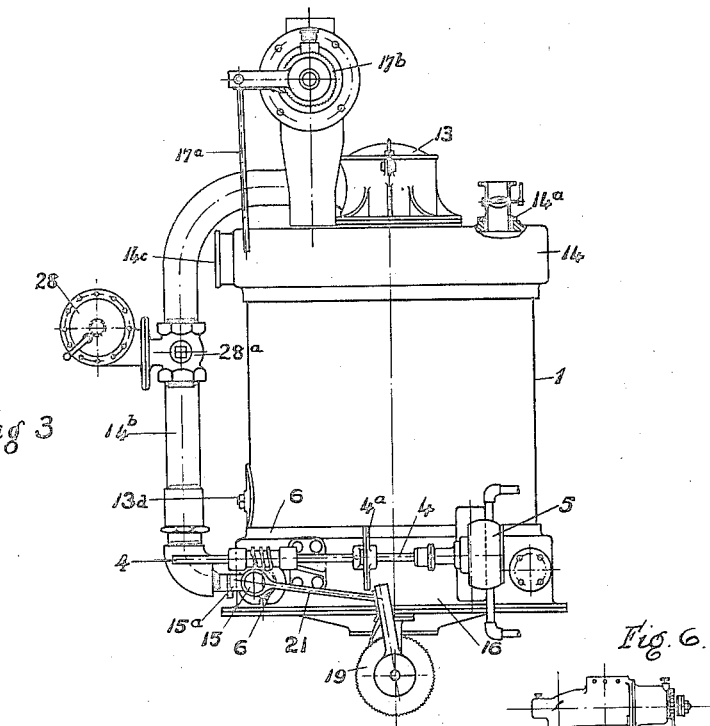
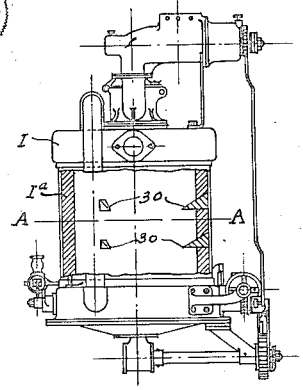
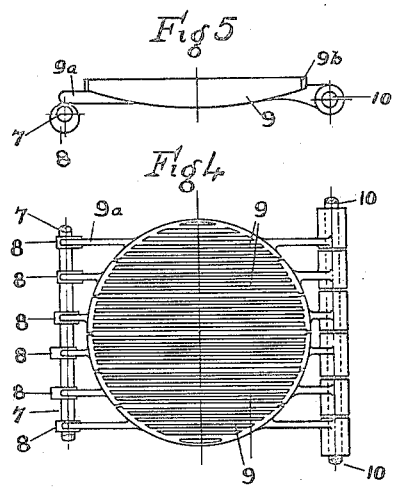
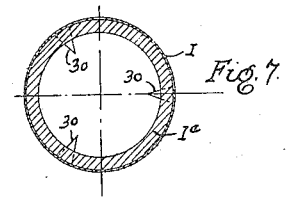

UNITED STATES PATENT OFFICE.

DAVID J. SMITH, OF LONDON, ENGLAND.

GAS-PRODUCER.

1,377,935. Specification of Letters Patent. Patented May 10, 1921.

Application filed November 29, 1918. Serial No. 264,714.

*To all whom it may concern:*

Be it known that I, DAVID JOSEPH SMITH, major in the Army Service Corps, a subject of the King of Great Britain and Ireland, and a resident of 40 Woodberry Grove, Finsbury Park, London, N. 4., England, have invented new and useful Improvements in and Connected with Gas-Producers, of which the following is the specification.

This invention relates to a method of producing gas for supplying internal combustion engines, involving the use of a producer either of the suction or pressure types, that is to say, of the kind in which the gas is drawn from the producer by the suction of the engine, or that in which the supply is assisted by pressure supplied by a fan or the like.

The object of the invention is to provide a method permitting of a producer of relatively light weight, small size and high efficiency, adapted to supply gas to internal combustion engines and the like, capable of adapting itself automatically to varying loads, and to provide gas continuously and automatically of practically unvarying quality without distillation of the fuel, conditions which have not been possible in producers as hitherto made.

A further object of the invention is to provide a method permitting of a light, compact, and efficient producer in which all the operations are mechanically effected or mechanically controlled in proportion to the speed of the gas engine or the like to be supplied. A further object of the invention is to provide a new method or process of working which permits of the said high efficiency within a producer of the required small size and weight.

According to my invention I provide a method or process of working and apparatus for effecting the foregoing objects in which all or practically all of the necessary operations are mechanically and positively effected or controlled, said mechanical operations in the producer being preferably effected by the internal combustion engine to which the producer supplies gas, and by which a very small fire bed and small producer are possible.

The said operations are effected or controlled by a shaft preferably embodied with or upon the producer and driven by the engine supplied, the operations being:—

(1) fuel feed to producer,
(2) ash removal from producer,
(3) rocking grate or continuous agitation of fuel,
(4) water feed to feed heater and vaporizer,
(5) water feed to scrubber when a wet scrubber is used.

The fuel is fed to the producer mechanically and in direct ratio to the speed of the engine or the like, or the producer can be further controlled by the throttle so that more fuel can be fed when a full gas supply is passing to engine, irrespective of engine speed.

The supply of water to the vaporizer is also controlled by the speed of the engine or by the amount of gas passing. The water supply to the scrubber is also mechanically controlled.

The producer is fitted with a rocking grate or fire bars, or like mechanism, which fire bars are operated by the engine in proportion to its speed or the volume of gas passing, and apparatus also operated from the engine removes the ashes from below the grate. Both in the supply of fuel and removal of ashes, due precautions are taken to prevent the unnecessary access of air or loss of gas.

Gas may be produced by the suction of the engine in the usual manner, or a fan or blower operated by the engine and controlled in proportion to the engine speed or amount of gas required, or both, may be used to drive air through the producer and insure a full charge of gas reaching the engine, or deliver the gas under pressure for this or other purposes.

In order to give as large a burning surface to the fuel as possible within the small space provided and to prevent the fuel from becoming caked, I may place webs or fins across, or projecting from, the fire box of the generator to support the fuel and allow it to burn freely and give an easy passage for the steam and air to pass through the fuel.

The chief advantages obtained by this invention are (1) the reduction in size and weight of the producer in proportion to the volume of gas given off, (2) the rendering of all functions automatic after once starting, and making it possible for the producer to supply an engine with gas over a wide range of speed or volume, (3) the provision of means to control relatively the proportion of supplies of air, water and fuel, such proportion to be possible of variation as required, while the producer is in operation, (4) a producer capable of functioning so long as it is driven and supplied with fuel and water, (5) a flexible producer producing gas in proportion to the speed of the engine supplied or the demands made upon it, (6) automatic stoking and removal of ashes, thus preventing slowing or stopping of engine arising from production of poorer gas or stoppage of production, and (7) the ability to control the production of gas in anticipation of increased or decreased demands.

In order that my invention may be completely understood reference should be made to the accompanying sheet of drawings which illustrates the preferred mode of carrying it into effect—

Fig. 3 is an end view at right angles with Fig. 2.

Fig. 4 is a plan view of the grate.

Fig. 5 is an elevation of one fire bar of the grate and the shafts.

Fig. 6 is a vertical section showing the fireclay wall of the producer and the webs or fins.

Fig. 7 is a section of the said wall on the line A, A, of Fig. 6.

Figure 1:
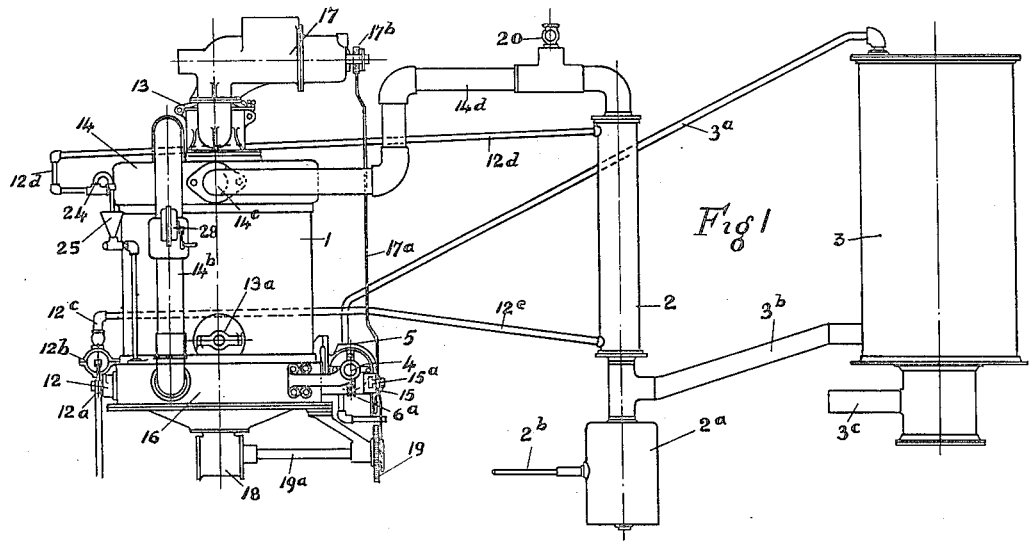
Figure 1 is a schematic diagram or extended general arrangement of the complete apparatus or plant.

As this invention consists of the several parts or elements constituting the complete producer plant or apparatus in combination as well as the special construction of producer or generator which elements are the means by which the new method of operation is carried out, reference is first made to the general arrangement, Fig. 1.

1 is the producer, 2 the feed water heater and gas cooler, 3 the gas scrubber or cleanser. The shaft 4 is driven by the engine to which the producer supplies gas or from any other source of power. The shaft 4 drives the rotary pump 5 which may be of any known construction. The pump 5 supplies the water by the pipe 3$^a$ to the scrubber 3 which scrubber serves to wash and cleanse the gas from the producer whence it is conveyed by the pipe 3$^b$ to the chamber 2$^a$ at the base of the feed water heater 2. The water is then conveyed back from the chamber 2$^a$ by the pipe 2$^b$ to the pump 5, thus completing the circuit. With regard to the construction of the chamber 2, this is simply an extension of the tube 14$^d$, but provided with a water jacket concentrically surrounding it, which construction will be obvious to anyone acquainted with the art. The chamber 2$^a$ is of known construction, it is a collecting chamber or sump for the water flowing from the chamber 3.

The gas scrubber or cleanser and cooler 3, which is shown in elevation, see Fig. 1, forms the subject matter of another and concurrent application for patent, Serial No. 264,713, entitled "Improvements in scrubbers, cleansers and coolers for gas."

It will be understood that any known feed water heater and cooler, and any known gas scrubber or cleanser may be used combined with the producer described, herein, but that the apparatus described in the said specification are those it is preferred to employ with the producer.

Referring now to these figures, the producer 1 has a boiler 14 and an ash pan 16, above which latter is a sectional grate including a series of movable sections 9. The producer also has a fuel receiving opening at its top, provided with a door 13 and in communication with a fuel feeding device 17. The boiler has a feed pipe 14$^d$ leading from the feed water heater 2 and is connected to the ashpan 16 below the grate by a pipe 14$^b$ having a manually actuated centrifugal fan 28.

Below the ashpan 16 is an ash removing device 18 on a shaft 19$^a$ and this shaft is connected through actuating means to be hereinafter described, to a shaft 7 mounted through the ashpan and having operating connection with the fuel feeding device above mentioned. Shaft 15 is connected to the main driven shaft 4 having a water pump 5 for the scrubber and cleaner 3.

Referring to Figs. 2, 3, 4 and 5, the shaft 4 also drives by means of a worm 6 and a worm wheel 6$^a$ a shaft 7 provided with cams 8 upon which cams rest the firebars 9 by means of arms 9$^a$ projecting therefrom. The firebars 9 are each formed integrally as a segment of the circular grate, see Fig. 4, there being as shown six such segments, and preferably four firebars to each segment, see the section, Fig. 2. The fire bar segments together form a circle as shown and are provided with an upwardly projecting portion or lip 9$^b$, see Fig. 5, adapted to project within the inner wall of the producer. The bars are pivotally mounted and adapted to rock upon the fixed shaft 10. Each cam 8 is set at 60 degrees apart from the adjacent cam, so that on the rotation of the shaft 7 the fire bars are rocked in succession and progressively from one side of the grate to the other, thus keeping the anthracite fuel within the producer in continuous movement.

At the opposite end of the cross-shaft 7 carrying the cams, a crank 12 is fitted. This crank is provided with a crank pin $12^a$ adjustable in a radial slot in the crank arm, so that the stroke can be adjusted from zero to its limit. The crank pin $12^a$ drives the plunger of the force pump $12^b$. The function of this pump is to deliver water into the boiler 14 of the producer via the water jacket of the feed heater 2. The water is conveyed by the pipe $12^c$ to the said jacket and the water raised in temperature by passing through said jacket having extracted heat from the gases flowing from the heater 2 is conveyed by the pipe $12^d$ to the boiler. The crank pin $12^a$ is so arranged that it can, if necessary, be varied in its position in the crank 12 while the producer is working.

On the same end of the cross-shaft that carries the worm wheel $6^a$ by which it is driven, is another crank arm 15. The pin $15^a$ of the crank 15 is also adjustable as to its stroke as before described with reference to crank 12, the crank pin being adapted to slide radially in the crank arm and by this means the stroke of the crank pin is adjustable therein. This crank drives a worm conveyer 17 for conveying the fuel into the producer by means of the rod $17^a$ mounted upon the said crank pin. The anthracite is fed from a hopper, not shown, fitted with an airtight lid secured above the conveyer 17. The screw conveyer is operated by the crank 15 by the rod $17^a$ by means of the ratchet wheel $17^b$. The crank 15 also operates by means of the rod 21, and the ratchet wheel 19 and shaft $19^a$, an ash discharge device 18 fitted to the bottom of the ashpan 16. The ash discharge consists of a cylindrical casing secured below the ashpan having a port $18^a$ communicating with the ashpan 16 above it and having a discharge opening $18^b$ at the bottom of the cylinder. A hollow cylindrical plug $18^c$ is rotated inside the cylinder 18 and when the hole in the plug registers with the hole in the body, the ashes from the pan drop into the plug. During the rotation of the plug the opening $18^b$ therein registers with the hole in the bottom of the cylinder and the ashes are discharged in an airtight manner. By varying the stroke of the crank pin in crank 15 and also by varying the position of the connecting rods 21 and $17^a$ in the ratchet levers, it is possible to vary the speed or feed of the fuel to the generator and of the ash discharge from the generator to any desired extent.

In commencing to work the apparatus the screwed airtight cover 13 is opened and a fire is laid on the fire bars 9, the fire having been lighted through aperture $13^a$. The cover on this aperture is closed, and a hand operated centrifugal fan 28, see Fig. 3, forces air by the pipe $14^b$ into the ashpan 16 through an aperture capable of being closed by a cock $28^a$. When the fire is seen to be well alight, the cover 13 is closed and screwed down, and the cock 20 is opened, the fan still being operated. The gas issuing from the cock is tested with a light, and as soon as it burns satisfactorily, cock 20 is closed, and the engine to which the plant is supplying gas is then started, or in the event of the plant not supplying gas to an engine, the gas is then made use of as required.

Figure 2:
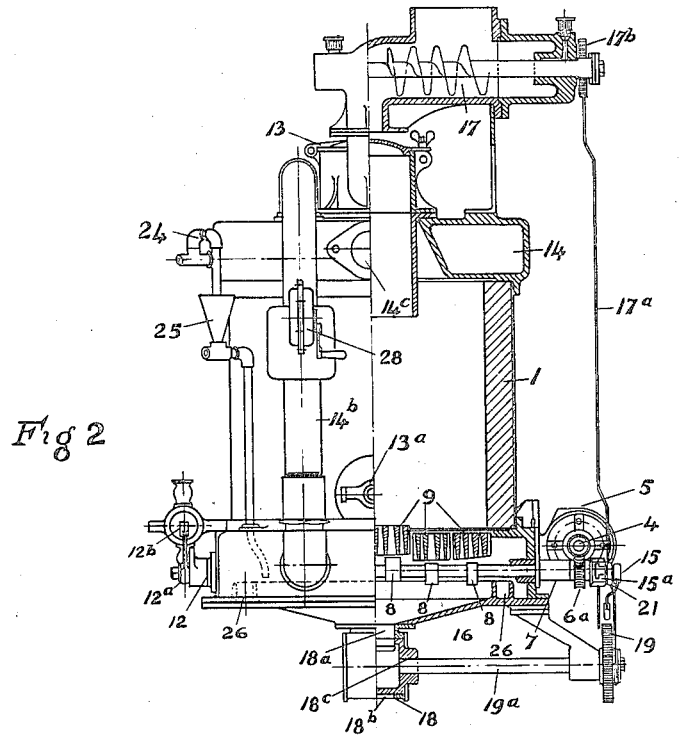
Fig. 2 is an elevation of the producer, part section, to a larger scale.

In operation after the starting previously described, air is drawn in by the suction of the engine through the pipe $14^a$ in the boiler 14, a section of which is shown in Fig. 2. The air passes over the surface of the water contained in the boiler and becomes more or less saturated with water vapor. The mixture of air and water vapor then passes down the tube $14^b$ into the ashpan 16. The mixture then passes up through the fire bars through the fire in the producer and issues from port $14^c$ and passes by the pipe $14^d$ to the gas cooler and feed water heater 2, thence by the pipe $3^b$ into the scrubber and cleanser 3, the cleansed and washed gases then passing by the pipe $3^c$ to the engine.

The water that is supplied to the boiler 14 by the pump via the jacket of the feed heater 2 is kept at a certain level by means of the siphon 24 which carries off any water above that quantity necessary to maintain the level in the boiler 14 to the desired height. The tubes which convey the water to and from the boiler 14 are fitted with their ends or openings as near the center of the boiler as possible, so that the level of the water will not be unduly affected by the generator or producer becoming tilted in any direction. The overflow of the water passes by means of a funnel 25 down the tube connected therewith and is there led into the annular channel 26 formed in the bottom plate of the ashpan. The annular channel 26 is filled with asbestos string or similar absorbent material, which soaks up the water and prevents its being lost when the generator or producer is tilted from its correct position, as would happen if the water was simply lying free in the channel. The heat from the firebars vaporizes this water and the vapor mingles with the said mixture of air and water vapor passing through the grate. Any surplus water which may pass from the boiler 14 overflows this channel and is got rid of with the ashes through the ash discharge 18.

The rocking bars keep the fire always free from ash and maintain it in a clear condition, so that it can deal at once with sudden calls for more gas. The bars being rocked in proportion to the speed of the engine maintain the fire in the necessary condition in accordance with the work being done. The water feed to the boiler 14 is also maintained in proportion to the speed of the shaft 4, and by varying the stroke of the crank pin in the crank arm 12, more or less water can be given so as to meet sudden conditions, such as ascending or descending a long hill respectively. The fuel feed by the worm conveyer 17 and the ash discharge are also driven at speeds proportionate to the speed of the shaft and therefore function proportionately.

A throttle valve of the usual butterfly type is fitted to the air pipe or opening 14ᵃ in the boiler 14, and this is coupled, in the case of the generator supplying the gas to an engine by a link 42 connected with the throttle valve of the engine. This coupling is important and constitutes an element in the construction and method, as it will readily be seen that in order to meet sudden calls for more gas, it is necessary to partially close the pipe 14ᵃ as the throttle valve to the engine is opened. The result of this is that a slight vacuum is caused in the boiler 14. This makes use of the natural law that water boils at a lower temperature if pressure is reduced. The result of partially closing the pipe 14ᵃ therefore, is to cause the water in the boiler 14 to give off a much larger quantity of vapor and thus meet extra calls from the engine for gas, such as when the engine is working full power at slow speed. The throttle connected to the pipe 14ᵃ can be coupled with the throttle on the engine or work independently if desired. Either or both of these throttles can be controlled by the engine governor if the producer is employed with a governed engine.

Referring to Figs. 6 and 7, the fireclay 1ᵃ is fitted in known manner to the interior of the metal casing of the producer 1 which is otherwise of the same construction as shown in Figs. 1, 2 and 3. The webs or fins 30 are fitted within the fireclay walls and are secured to the casing. They project inwardly into the producer and are of triangular form in plan, Fig. 7. As shown in Fig. 6 which illustrates the fins in front view as well as section, the projecting portion of the fin has obliquely inclined surfaces in order that the nuts of incandescent fuel contacting therewith may when agitated by the firebars be moved laterally.

In this generator it should be noted that the fire is of comparatively shallow height relatively to diameter. This puts less back pressure on the suction of the engine and tends to produce a clearer fire.

In producers as hitherto made, the action of the producer being generally governed by the suction of the engine alone and there being a large mass of fuel through which to draw the gas, causes a loss of power on account of the considerable back pull upon the piston, there being at the end of the induction stroke so considerable a degree of vacuum in the cylinder of the engine that a full weight of working fluid is not admitted to the cylinder. In this construction there is at all times a small or relatively shallow body of fuel through which to draw the gas as by the means for agitating and feeding of fuel and the removal of ashes a very small body of fuel relatively to the size of the engine is in use at any time in the producer and therefore a reduced resistance to the passage of the gas, consequently there is much less negative pressure in the induction pipe and a much greater relative power of the engine is produced.

It will thus be seen that all functions of the producer are automatic, and that it will continue to work as long as the supply of water and fuel lasts, and it is driven without attention. It is also capable of dealing with varying demands for gas at short notice, and owing to the condition in which the fire is kept by the rocking firebars and the automatic control of the water feed and the other described operations, a very small producer is necessary to give off a certain amount of power or gas.

What I do claim as my invention and desire to secure by Letters Patent is:—

1. The herein described method which consists in forming a fire bed relatively shallow in proportion to area, constantly agitating the same throughout, feeding fuel thereto in small regular quantities during operation, whereby the fuel rapidly becomes incandescent on reaching the fire bed, and in maintaining an even high temperature throughout the fuel bed so that the gas given off is clean and of even quantity and slow distillation is avoided.

2. The method according to claim 1, wherein steam and air are continuously forced through the incandescent fuel bed.

3. The method according to claim 1, wherein the ash is mechanically and positively removed from beneath the fuel bed.

4. The herein described continuous method of generating producer gas suitable for use in gas engines, which method consists in forming a relatively shallow incandescent fire bed of carbonaceous material and in maintaining said bed in said incandescent state throughout and in such a high temperature that the desired gas can be continuously produced as the proper amount of air is continuously fed to the incandescent mass, feeding carbonaceous material to the incandescent mass in small regular quantities during the gasifying operation and in a manner whereby the fuel thus fed rapidly becomes incandescent on reaching the incandescent fire bed, constantly agitating the material in the fire bed, supplying air to said fire bed in a manner to maintain an even high temperature in and throughout the fire bed and in such a manner that the desired gas is given off and slow distillation is avoided.

5. The method according to claim 4 wherein steam and air are continuously forced through the incandescent fuel bed.

6. The method according to claim 4 wherein the ash is mechanically and positively removed from beneath the fuel bed.

DAVID J. SMITH.